United States Patent Office 2,915,045
Patented Dec. 1, 1959

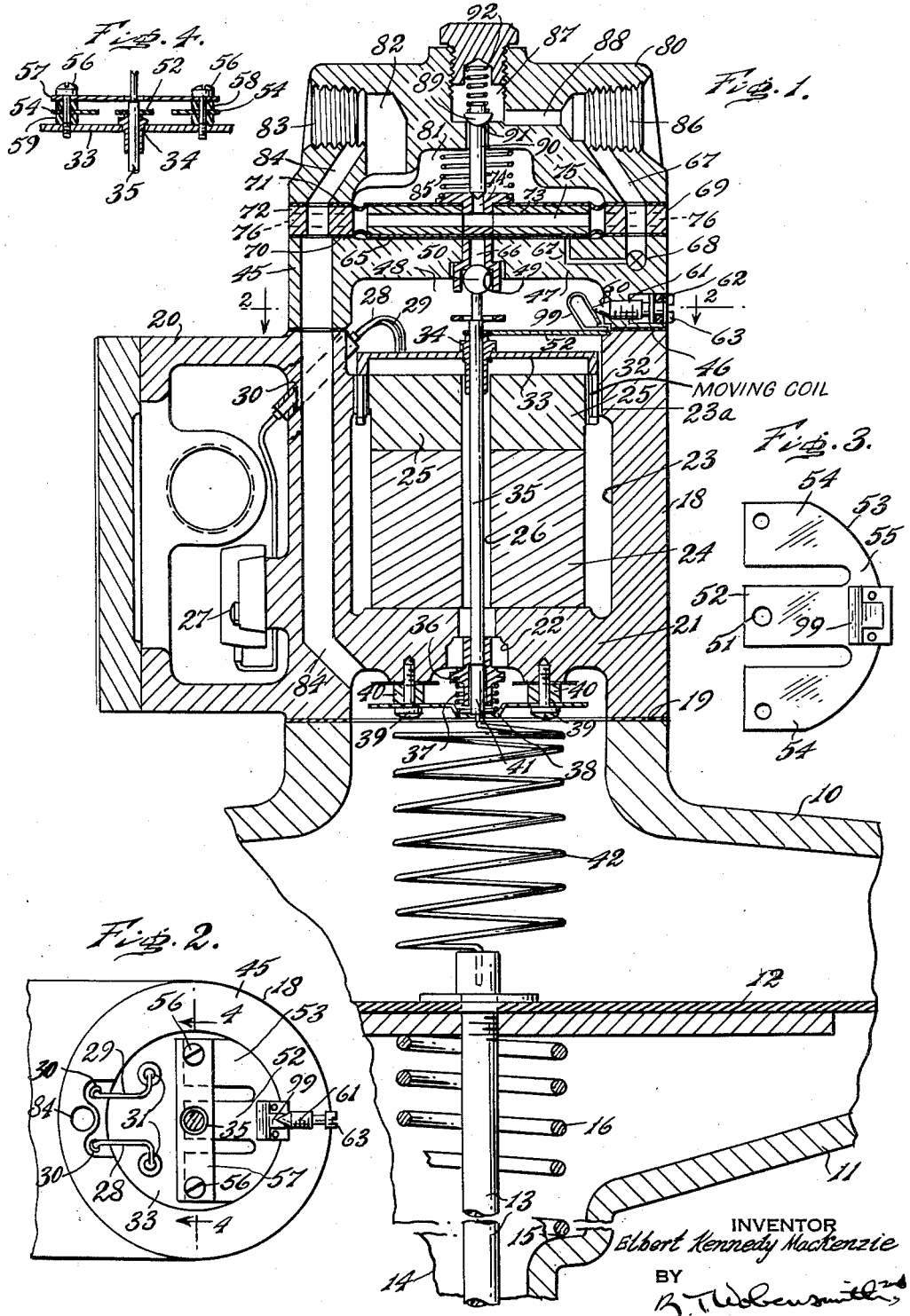

2,915,045

VALVE POSITIONERS

Elbert Kennedy Mackenzie, Oreland, Pa., assignor to Moore Products Co., Philadelphia, Pa., a corporation of Pennsylvania Application May 27, 1957, Serial No. 661,721

9 Claims. (Cl. 121—41)

This invention relates to valve positioners.

It is the principal object of the present invention to provide a valve positioner in which an electrical input is employed to provide a controlled pressure for positioning a valve or the like.

It is a further object of the present invention to provide a valve positioner in which an electrical input is employed in conjunction with a pneumatic circuit, and in which the components are disposed in a compact and coaxial arrangement.

It is a further object of the present invention to provide a valve positioner in which an electrical input is employed in conjunction with a pneumatic circuit and which is suitable for mounting on the valve actuator body with a direct coupling between the actuator diaphragm or piston and the span determining spring.

It is a further object of the present invention to provide a valve positioner of the character aforesaid, in which an improved type of zero spring is employed, this spring being disposed in a particularly advantageous manner.

It is a further object of the present invention to provide a valve positioner in which levers and their pivots have been eliminated, so as to avoid friction and hysteresis.

Other objects and advantageous features of the invention will be apparent from the description and claims.

The nature and characteristic features of the invention will be more readily undersood from the following description, taken in connection with the accompanying drawings forming part thereof, in which:

Figure 1 is a vertical central sectional view of a valve positioner in accordance with the invention;

Fig. 2 is a horizontal view taken approximately on the line 2—2 of Fig. 1;

Fig. 3 is a top plan view of a preferred form of zero spring removed from the instrument; and Fig. 4 is a fragmentary vertical sectional view taken approximately on the line 4—4 of Fig. 2.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, in which a preferred embodiment of the invention is illustrated, upper and lower sections 10 and 11 of a diaphragm motor casing are shown with a motor diaphragm 12 interposed therebetween in the usual manner. While the diaphragm motor casing is shown in an upright position it should be understood that it could be positioned as desired, i.e., horizontal, inclined or even in a position upside down from that illustrated.

The diaphragm 12 can have a stem 13 connected thereto for movement therewith and the stem 13 is connected to a valve plug (not shown) or other controlling element to be positioned.

The lower casing section 11 can have a downwardly extending portion 14 with a shoulder 15 for engagement by one end of a diaphragm return compression spring 16. The other end of the spring 16 engages the underside of the diaphragm 12.

The upper end of the upper casing section 10 has a housing 18, preferably of magnetic responsive material, secured thereto in fluid tight relation with an interposed gasket 19 and is provided with a side terminal junction box 20 extending therefrom. The lower end of the housing 18 has a transverse wall 21 with a central opening 22 therethrough and above the wall 21 an enlarged vertical opening 23 is provided concentric with a longitudinal line through the center of the diaphragm 12 and has a concentric inwardly extending rim portion 23a. The opening 23 has a permanent magnet 24 mounted therein with a pole piece 25 at the upper end thereof. The magnet 24 is preferably of exceedingly high magnetic energy material, such as that available under the trade name "Alnico." The magnet 24 and its pole piece 25 are cylindrical in shape, preferably in spaced relation to the opening 23 and have a central opening 26 coaxial with the vertical line through the center of the diaphragm 12. A magnetic path is provided which includes the magnet 24, the housing 18 with its wall 21 and rim 23 and the pole piece 25. The magnetic path has a gap between the inner face of the rim 23 and the outer and contiguous peripheral rim of the pole piece 25.

The junction box 20 has a plurality of contact terminals 27 from which conductors 28 and 29 extend through pressure-tight bushings 30 disposed in the side wall of the housing 18 to terminals 31 on an electromagnetic coil 32 of ring shape. The coil 32 extends in the space between the pole piece 25 and the inner surface of the housing 18.

The terminals 27 are connected to a variable input source of electrical energy which may be in the range of from 0.5 to 5 milliamperes and at a voltage of about 15 volts D.C., or other preferred input range. The terminals 27 are connected with the desired polarity in accordance with the requirements for direct action, where increasing current provides increased air pressure on the diaphragm 12, or for reverse action.

The coil 32 is carried on a cup shaped mounting 33 which is secured by a bushing 34 at the center thereof to a rod 35 concentric with and in spaced relation to the opening 26. The rod 35, at its lower end, is mounted in and centered by a bushing 36. The bushing 36 is urged by a compression spring 37 away from a protecting plate 38 secured to the lower face of the wall 21, in spaced relation thereto, by studs 39 and spacers 40. The bushing 36 also has mounted therein, for applying a force on the rod 35, and coaxial therewith, one end of a range span spring 42. The other end of the spring 42 is connected to the diaphragm 12.

An intermediate housing 45 is provided connected to the housing 18 and with an interposed gasket 46 to prevent fluid leakage. The intermediate housing 45 has a transverse wall 47 which provides a chamber 48 therebelow. The wall 47 has a valve seat 49 centrally thereof and coaxial with the longitudinal line through the center of the diaphragm 12. On the upper end of the rod 35 a ball 50 is provided for movement towards and away from the valve seat 49. The bushing 34 is secured, at an opening 51, to a central arm 52 of a zero adjusting spring 53. The central arm 52 by its engagement with the bushing 34 urges the rod 35 downwardly. The zero adjusting spring 53, shown in more detail in Fig. 3, is of flat spring metal and is of "e" or eta shape with arms 54 parallel to the central arm 52, the arms 52 and 54 being connected by a connector section 55. The ends of the arms 54 are secured by bolts 56 extending through a stabilizing cross bar 57 spaced by spacers 58 above the arms 54 and extending through spacers 59 into the pole piece 25.

In order to change the configuration of the arms 52 and 54 of the zero spring 53 simultaneously, an inclined abutment 99 is provided on the spring 53 against which the rounded end 60 of a zero adjusting screw 61 bears and which, in turn, overhangs and slidably engages the wall of the housing 18. The screw 61 is mounted in the side wall of the intermediate housing section 45, with a packing 62 for preventing fluid leakage and with its head 63 accessible at the exterior of the housing section 45 for manual adjustment. The manual adjustment of the screw 61 causes a combination of sliding and pivotal contact of the abutment 99 at its place of contact with the housing 18 and as restrained by the arms 54.

The resulting deflection of the arms 54 and 52 is substantially identical and therefore the opening 51 in the arm 52 remains in a fixed position with respect to the mounting holes in the arms 54, as seen in Fig. 3. A variable force is thereby made available, acting on the rod 35 and providing a zero setting, and at the same time a centering action which is not affected by changes in the zero adjustment.

The upper end of the wall 47 is dished to provide a chamber 65 with which a passageway 66 communicating with the valve seat 49 is in communication and has a passageway 67 with a restriction 68 therein in communication therewith.

The intermediate housing 45 has thereabove a diaphragm unit 69 which includes diaphragms 70 and 71 with a mounting ring 72 therebetween, and a central spacer 73 therebetween for simultaneous movement of the diaphragms 70 and 71. The diaphragm 70 provides a boundary of the chamber 65. The spacer 73 has a port 74 therein communicating with a passageway 75 which is in communication with the atmosphere through a passageway 76 in the ring 72.

An upper housing 80 is provided having a chamber 81 therein, bounded by the diaphragm 71, and from which a passageway 82 extends to a gage connection 83, and a passageway 84 extends through the diaphragm unit 69 and the intermediate housing 45 to the interior of the upper casing section 10.

The upper housing 80 within the chamber 81 has a coil spring 85 in engagement with the diaphragm 71 and the upper interior wall thereof.

The upper housing 80 is also provided with a supply connection 86 which is connected to a suitable source of fluid under pressure, and preferably pressure regulated and filtered air. The passageway 67 preferably extends to and is in communication with the supply connection 86.

The upper housing section 80 also has a valve chamber 87 therein connected by a passageway 88 to the supply connection 86 and has a valve ball 89 therein, mounted on a valve stem 90 and urged to seating position with respect to a port 91, connecting the valve chamber 87 and the chamber 81, by a spring 92. The valve stem 90 has its lower end movable with respect to the port 74.

The mode of operation will now be pointed out.

The desired electrical energy input and at the selected polarity is applied through the input terminals 27 and the conductors 28 and 29 to the coil 32. The electrical energy in the coil 32 sets up a magnetic field which reacts with the magnetic field in the gap between the pole piece 25 and the rim 23a, to produce a force, either opposing or additive to the force exerted by the spring 42 on the rod 35.

The zero spring 53 is first assumed at a selected setting so that the arm 52 exerts a downward force on the rod 35 but can be adjusted by the positioning of the screw 61 to vary the zero setting.

A force balance continuously exists between the electromagnetic force effective in the coil 32 from the input signal, the force of the span spring 42, the force of the zero spring 53, the force of the spring 37, if that spring is used, the weight of the coil and rod assembly, and the force of the fluid on the ball 50.

Air under pressure is supplied through the supply connection 86 and through the passageway 67 and the restriction 68 to the chamber 65 to supply a pilot pressure in that chamber. The level of the pressure in the chamber 65 will be determined by the positioning of the valve ball 50 with respect to the seat 49, to control the discharge of air from the chamber 65 to the chamber 48.

The central portion of the diaphragm unit 69 is controlled by the difference between the fluid pressure in the chamber 65 and that in chamber 81, and equilibrium conditions exist when the differential pressure exactly balances the force of spring 85.

Unbalance of the central portion in the upward direction opens the valve ball 89 from its seat 91 to admit air from the supply connection 86 and passageway 87 to increase the pressure in the chamber 81 and thence through the passageway 84 and in the upper motor diaphragm casing section 10. This causes downward movement of the diaphragm 12, decreasing the force exerted by the spring 42 on the rod 35. Downward motion of the rod 35 permits the ball 50 to move away from the seat 49, thereby to reduce the pressure in the chamber 65 and restore the diaphragm unit 69 to balanced condition.

Unbalance of the central portion of the diaphragm unit 69 in the downward direction opens the exhaust port 74 to exhaust air from the chamber in the upper housing section 10 through the passageway 84, the chamber 81, and the passageways 75 and 76 to the atmosphere. This causes upward movement of the diaphragm 12, compresses the spring 42, and this force, effective on the rod 35, moves the ball 50 upwardly towards the seat 49 to increase the pressure in the chamber 65 and restore the diaphragm unit 65 to a balanced condition.

In balanced condition a small flow of air is permitted to discharge through the passageway 66 and around the coil 32 to purge the contiguous space, and to accommodate this flow a small flow through the port 74 for discharge to atmosphere is also permitted.

I claim:

1. In positive positioning apparatus for a pressure fluid actuated member, a first body portion having an expansible chamber with a movable wall portion responsive to a control pressure fluid in said chamber, a second body portion extending from said first body portion, and means for applying a control pressure fluid in said chamber, said means including a connection to a source of fluid under pressure, a valve member in communication with said fluid connection and disposed in said second body portion for controlling the supplying of said control fluid, and members for controlling said valve member including a rod in said second body portion having an operating connection to said movable wall portion, and electromagnetic members in said second body portion and responsive to an input signal for applying a force on said rod.

2. In positive positioning apparatus for a pressure fluid actuated member, a first body portion having an expansible chamber with a movable wall portion responsive to a control pressure fluid in said chamber, a second body portion extending from said first body portion, and means for applying a control pressure fluid in said chamber, said means including a connection to a source of fluid under pressure, a valve member in communication with said fluid connection and disposed in said second body portion for supplying said control fluid, and members for controlling said valve member including a rod in said second body portion having an operating connection to said movable wall portion, electromagnetic members in said second body portion and responsive to an input signal for applying a force on said rod, and a variable zero spring connected to said rod for applying a force on said rod.

3. In positive positioning apparatus for a pressure fluid actuated member, a first body portion having an expansible chamber with a movable wall portion responsive to a control pressure fluid in said chamber, a second body portion extending from said first body portion coaxially with respect to said movable wall portion, and means for applying a control pressure fluid in said chamber, said means including a connection to a source of fluid under pressure, a valve member in communication with said fluid connection and disposed in said second body portion for controlling the supplying of said control fluid, and members for controlling said valve member including a rod in said second body portion having a coaxial operating connection to said movable wall portion, and electromagnetic members coaxially disposed in said second body portion and responsive to an input signal for applying a force on said rod.

4. In positive positioning apparatus for a pressure fluid actuated member, a first body portion having an expansible chamber with a movable wall portion responsive to a control pressure fluid in said chamber, a second body portion extending from said first body portion coaxially with respect to said movable wall portion, and means for applying a control pressure fluid in said chamber, said means including a connection to a source of fluid under pressure, a valve member in communication with said fluid connection and disposed in said second body portion for controlling the supplying of said control fluid, and members for controlling said valve member including a rod in said second body portion having a coaxial operating connection to said movable wall portion, and electromagnetic members coaxially disposed in said second body portion and responsive to an input signal for applying a force on said rod, said operating connection including a range spring connected to said rod for applying a force on said rod.

5. In positive positioning apparatus for a pressure fluid actuated member, a first body portion having an expansible chamber with a movable wall portion responsive to a control pressure fluid in said chamber, a second body portion extending from said first body portion and having interior portions spaced to provide an annular gap, and means for applying a control pressure fluid in said chamber, said means including a connection to a source of fluid under pressure, a valve member in communication with said fluid connection and disposed in said second body portion for controlling the supplying of said control fluid, and members for controlling said valve member including a rod in said second body portion having an operating connection to said movable wall portion, and an electromagnetic coil member carried by said rod and movable in said gap responsive to an input signal for applying a force on said rod, said gap being in communication with said expansible chamber.

6. In positive positioning apparatus for a pressure fluid actuated member, a first body portion having an expansible chamber with a movable wall portion responsive to a control pressure fluid in said chamber, a second body portion extending from said first body portion coaxially with respect to said movable wall portion, said second body portion having portions therein spaced to provide an annular gap coaxial with said second body portion, and means for applying a control pressure fluid in said chamber, said means including a connection to a source of fluid under pressure, a valve member in communication with said fluid connection and disposed in said second body portion for controlling the supplying of said control fluid, and members for controlling said valve member including a rod in said second body portion having a coaxial operating connection to said movable wall portion, and an electromagnetic coil member carried by said rod and coaxially disposed in said second body portion and movable in said gap responsive to an input signal for applying a force on said rod.

7. In positive positioning apparatus for a pressure fluid actuated member, a first body portion having an expansible chamber with a movable wall portion responsive to a control pressure fluid in said chamber, a second body portion extending from said first body portion and having interior portions spaced to provide an annular gap, and means for applying a control pressure fluid in said chamber, said means including a connection to a source of fluid under pressure, a valve member in communication with said fluid connection and disposed in said second body portion for controlling the supplying of said control fluid, and members for controlling said valve member including a movable member in said second body portion, a range spring in direct engagement at one end with said movable wall portion and at the other end with said movable member, an actuating connection between said movable member and said valve member, and an electromagnetic coil member carried by said movable member and movable in said gap responsive to an input signal for applying a force on said movable member.

8. In positive positioning apparatus for a pressure fluid actuated member, a first body portion having an expansible chamber with a movable wall portion responsive to a control pressure fluid in said chamber, a second body portion extending from said first body portion, and means for applying a control pressure fluid in said chamber, said means including a connection to a source of fluid under pressure, a valve member in communication with said fluid connection and disposed in said second body portion for controlling the supplying of said control fluid, and members for controlling said valve member including a movable member in said second body portion connected to said movable wall portion, a resilient member connected to said movable member in centering and supporting relation thereto and applying a force thereon, and electromagnetic members disposed in said second body portion and responsive to an input signal for applying a force on said movable member.

9. In positive positioning apparatus for a pressure fluid actuated member, a body portion having an expansible chamber with a movable wall portion responsive to a control pressure fluid in said chamber, another body portion supported by said first body portion, and means for applying a control pressure fluid in said chamber, said means including a connection to a source of fluid under pressure, a valve member in communication with said fluid connection and disposed in one of said body portions for controlling the supplying of said control fluid, and members for controlling said valve member including a rod in one of said body portions, operating connections from said rod to said movable wall portion, electromagnetic members in one of said body portions and responsive to an input signal for applying a force on said rod, and a flat zero spring for applying a force on said rod, said spring being disposed transversely to the axis of said rod, said spring having a central arm and side arms parallel thereto and joined at one extremity, the other extremity of the central arm being secured to said rod, mounting members in one of said body portions to which said side arms are secured, said last mentioned body portion having a pivotal support for said spring, and a member for depressing said spring about said support for controlling the force exerted on said rod by said spring.

References Cited in the file of this patent

UNITED STATES PATENTS

| | | |
|---|---|---|
| 2,759,129 | Swartwout | Aug. 14, 1956 |
| 2,780,230 | Freeman | Feb. 5, 1957 |
| 2,817,318 | Mackenzie et al. | Dec. 24, 1957 |